May 16, 1933. R. C. FRYER 1,908,833
ELECTRIC METER
Filed July 30, 1930 7 Sheets-Sheet 1

INVENTOR
Roy C. Fryer
BY Bogert + Bogert
ATTORNEYS

May 16, 1933.  R. C. FRYER  1,908,833
ELECTRIC METER
Filed July 30, 1930  7 Sheets-Sheet 3

INVENTOR
Roy C. Fryer
BY Bogert & Bogert
ATTORNEYS

May 16, 1933.       R. C. FRYER         1,908,833
ELECTRIC METER
Filed July 30, 1930       7 Sheets-Sheet 7

Fig. 13.

Patented May 16, 1933

1,908,833

UNITED STATES PATENT OFFICE

ROY C. FRYER, OF CINCINNATI, OHIO, ASSIGNOR TO THE DUNCAN ELECTRIC MANUFACTURING COMPANY, OF LA FAYETTE, INDIANA, A CORPORATION OF ILLINOIS

ELECTRIC METER

Application filed July 30, 1930. Serial No. 471,737.

This invention relates to a meter which is especially designed and has for an object to produce a permanent record of the demand being made upon a source of current supply over definite time intervals.

A further object is to produce such a meter as will cause a permanent record to be made of the amount of energy which is consumed over elapsed time intervals, and, in so doing, indicate how much more current is still allowable within each of any of the definitely set time intervals.

A further object is to produce a meter which will indicate the rate at which current consumption takes place throughout predetermined time intervals.

These and other objects are attained in the meter which I will now describe and which is disclosed in the accompanying drawings, in which:—

The demand meter chart A which is preferably employed will be first described whereafter its association with the balance of the instrument will be set forth. This chart is most clearly shown in Fig. 13. It is preferably vertical and is constantly driven at a uniform speed by a clock or other constant speed motor and may be spaced longitudinally into suitable major time intervals say fifteen minute intervals as indicated at 10, 10:15, 10:30, etc., these major intervals being blocked off by the heavier black transverse lines, each major interval being subspaced into ten minor intervals. The kilowatt hour demand scale is subdivided crosswise of the chart by longitudinal lines, the desired maximum demand 1.0 being indicated at the heavier longitudinal black line, the space to the left being subdivided into equal divisions at .9, .8, .7, .6, .5, .4, .3, .2, .1, and the space to the right being subdivided into 5 equal divisions at 1.1, 1.2, 1.3, 1.4, 1.5. Lines L are drawn upon the chart by a pen which is driven transversely toward the right hand side of the chart at a rate proportional to the speed of the meter motor. This pen is thus driven during each fifteen minute or other selected interval, and is tripped back to zero at the conclusion of such interval.

Figure 13:
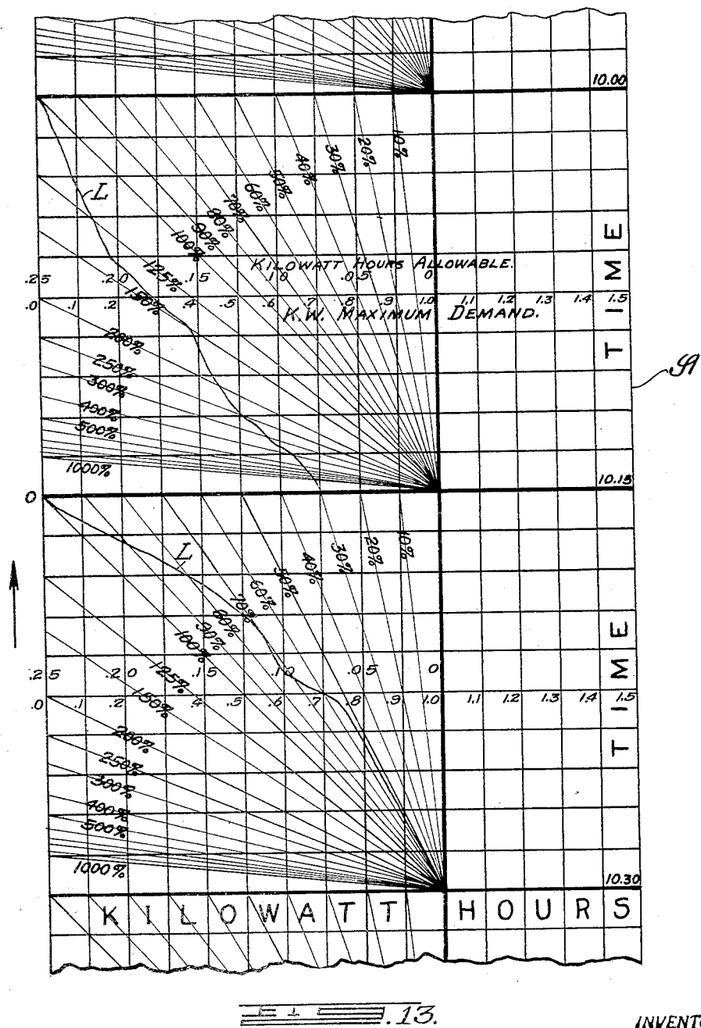
Fig. 13 illustrates the preferred form of chart.

The position of the moving chart shows the elapsed time and the position of the pen, acting as a demand pointer, shows on the chart how much energy has been consumed during the corresponding interval, and how much is still allowable. A friction pointer driven ahead by the demand pointer or pen remains at the farthest point reached. The sloping lines, marked in per cents on the chart, show what rates of consumption are required during the rest of each interval to conform to the desired maximum demand registration. The slope at which the pen line L is drawn, shows the existing load or rate of consumption and the finished lines give a record of past performance. The rate can be read approximately by noting which % line on the chart is practically parallel to the corresponding pen line, or it can be read more exactly by means of the square ruling, which easily reveals the slope of any part of the line.

Figures 10, 11, 12:
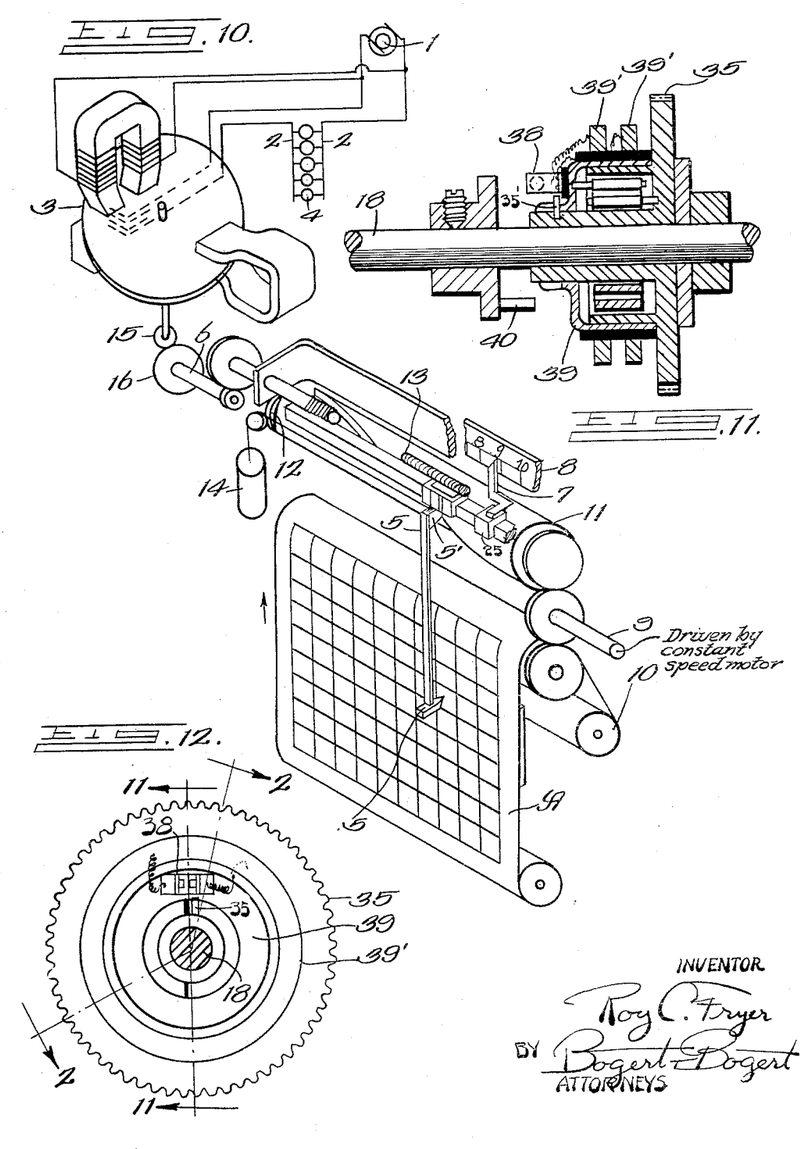
Fig. 10 is a diagramamtic illustration of the invention.
Fig. 11 is a sectional view on line 11—11 of Fig. 12.
Fig. 12 is a front elevation of the reverse drum mechanism and contacts.

In Fig. 10, I have illustrated a single phase alternating current generator 1 that supplies current to the consumption circuit 2 through the watt-hour meter motor 3, the load being illustrated at 4. The motor of the meter drives the meter pen or demand pointer 5, through suitable speed reducing gearing 6, rectilinearly across the meter chart 8, and the pen pushes ahead of it a resettable maximum demand indicating pointer 7. Pointer 7 remains at the furthest position to which it is pushed and indicates on a scale 3 the maximum demand since it was last reset. A suitable clock or other constant speed motor constantly drives the shaft 9. This shaft is in gear with and constantly drives the take up chart roll 10 and the moving contactor 11 at uniform speed. This contactor is shown in the form of a continuous helix on a drum. The clock mechanism rotates the drum one revolution during each demand interval. The meter pen 5 carries a contactor 5' which will engage the helical edge of the contactor 11 and close a circuit if the meter pen is driven above the diagonal 100% load line on the chart in the event that the predetermined desirable maximum demand is in the process of being exceeded by the use of the current.

At the end of each demand interval the demand pen or pointer has been driven by the meter mechanism or motor to a point where it becomes disconnected from said meter motor, whereupon the pen or pointer is moved by a return or restoring mechanism to the zero line of the chart that is just beneath the pen. This return mechanism includes a cam 12 on the drum 11 which lifts the driving screw 13 out of mesh with the pen and the meter gear, so that the weight 14 may return the pen to such zero line. The drum 11 completes one revolution during each demand interval to be in correct position at the beginning of the next succeeding interval.

The mechanism which is preferred will be more fully described in connection with Figs. 1 to 9, inclusive, 11 and 12. The gearing 6 which is driven by the meter motor includes an initial gear 15, in the form of a spur pinion, and a spur gear 16 which is in mesh with said pinion. This spur gear is coupled by a friction clutch 17 with the shaft 18. The clutch is operated by spring 19. A double pulley 20 is fastened securely to shaft 18. To the ends of a belt 21 are fastened to said pulley. The belt runs over pulley 22 and moves the pen 5, which is carried by said belt, across the meter chart rectilinearly. The pen is moved by a meter motor operated block 23, which is coupled with the belt and slides on a rod 24 which extends across the front of the instrument. A manually resettable block 25 also slides on said rod and serves to affect an indication on scale 3 of the maximum demand which occurred since the last resetting of this block. One revolution of the shaft 18 and pulley 20 is accompanied by the movement of pen 5 from the kilowatt scale mark 0 to the kilowatt scale mark 1.5, a full scale deflection. The shaft 27 is constantly driven at a constant speed by a suitable clock or other constant speed motor which turns, for example, one revolution a minute. A pinion 28 on shaft 27 drives gear 29 and pinion 30. Pinion 30 drives gear 31, which in turn drives gear 32. The latter gear turns one revolution each fifteen minutes. A spiral clock spring 33 is coupled with gear 31 and exerts a torque thereon in opposition to the torque of the aforesaid clock or constant speed motor on said gear 31. This spring is wound up by the clock during each fifteen minute demand interval. The gear 32 turns one revolution freely on the shaft 18 during each demand interval, and in the direction this shaft is being turned by a meter motor.

A gear 34 is secured on the same shaft with gear 31 and drives a demand limit or contactor gear 35 through the change gears 36 and 37. Assuming that the desired maximum demand is noted by the reading 1.0 on the chart, the gear 35 would make two thirds of a revolution in each fifteen minute interval and at a constant speed. The gear 35 turns freely on shaft 18 and carries the contactor 38. However, the contactor 38 is not fastened rigidly to the gear 35, but is connected with it through a light spiral spring in a spring drum 39, and is held in a normal position against a stop 35' (Fig. 11) on the gear 35 by the torque of this spring. The shaft 18 carries a contactor closing crank 40. With the structure thus far described, it will be apparent that if the average load on the meter since the beginning of a demand interval has been greater than the number of kilowatts chosen as the desired maximum demand, the shaft 18 will have turned farther than the contactor gear 35 thus making the crank 40 close the contactor 38 and push it ahead against the torque of the spring in drum 39 so that the rotation of the shaft 18 will not be retarded. Two slip rings 39' may be carried on the spring drum 39 for including the contactor in the circuit.

The chart roll 41 is driven by a worm 27' and a system of bevel gears 27ᵃ from the clock driven shaft 27. This will effect the desired upward travel of the chart.

Figures 1, 2:
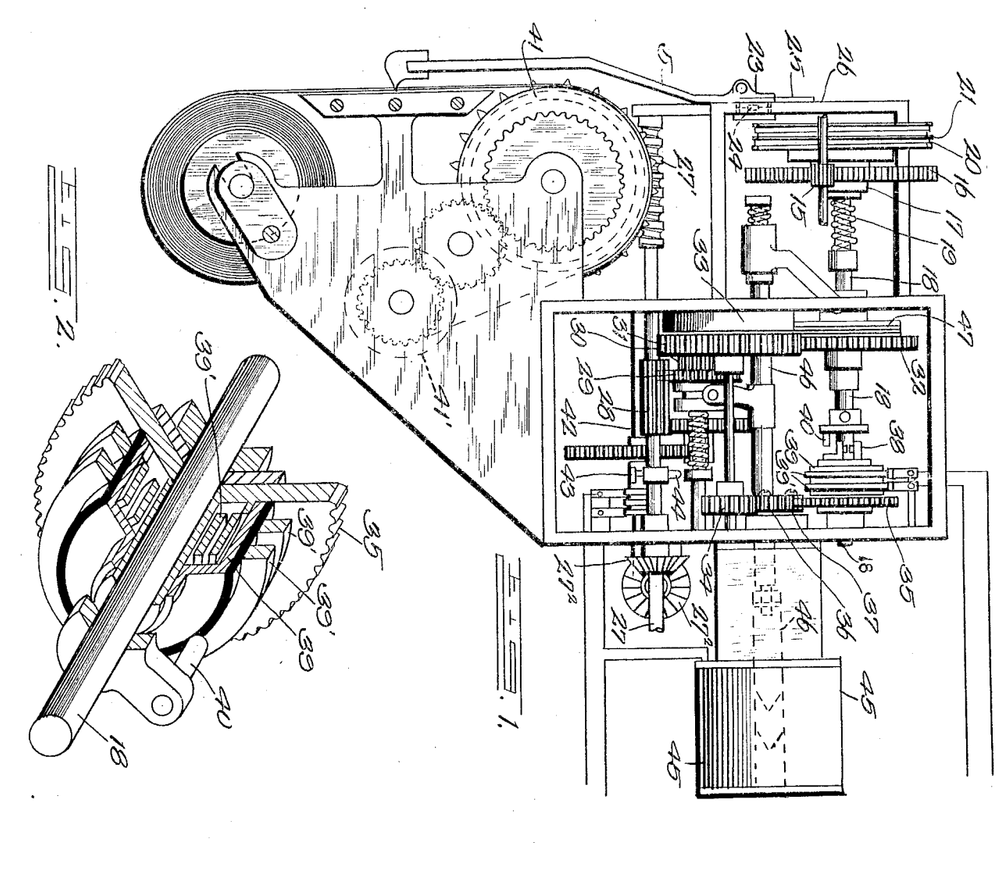
Fig. 1 is an end elevation of a meter equipped in accordance with the preferred embodiment of the invention.
Fig. 2 is a sectional perspective view of a part of a reverse drum mechanism.
Figure 3:
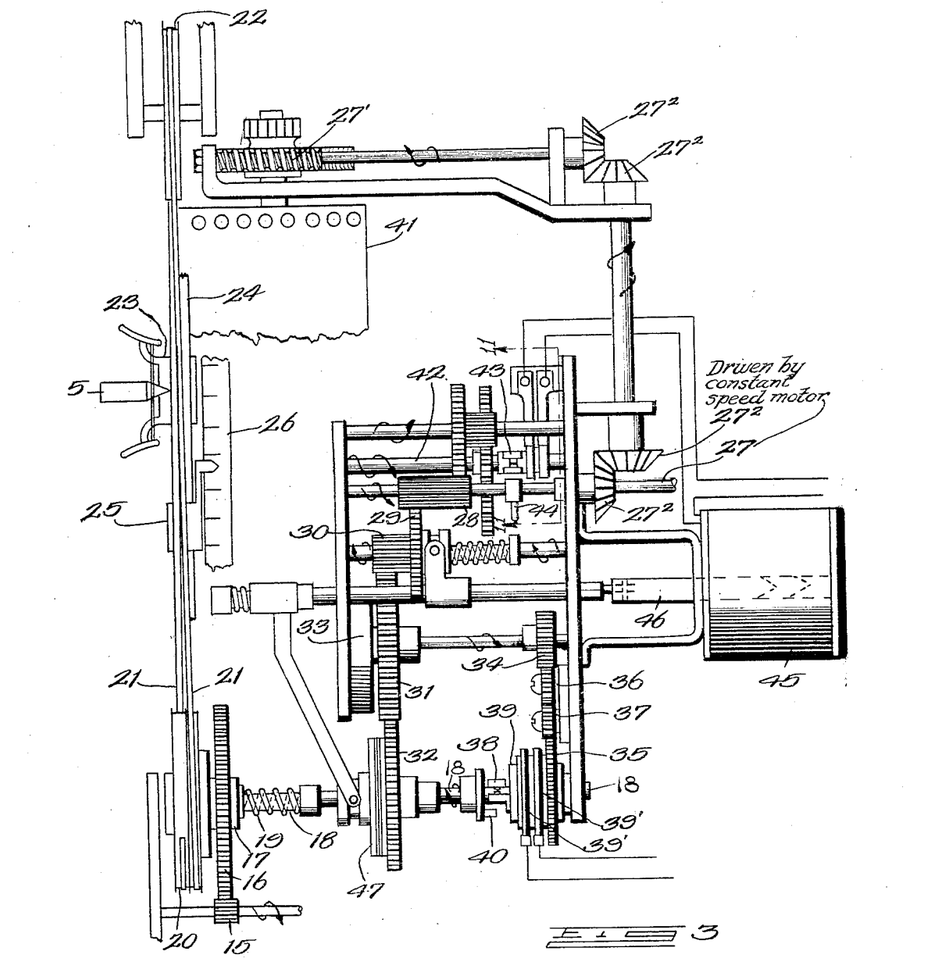
Fig. 3 is a diagrammatic plan view.
Figure 4:
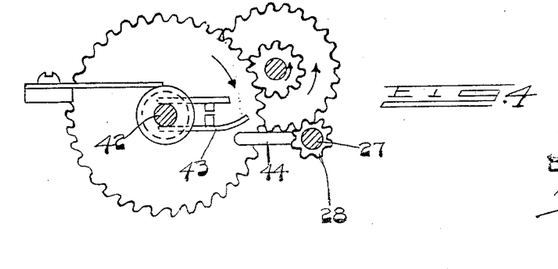
Fig. 4 illustrates a switching mechanism entering into the construction.
Figure 5:
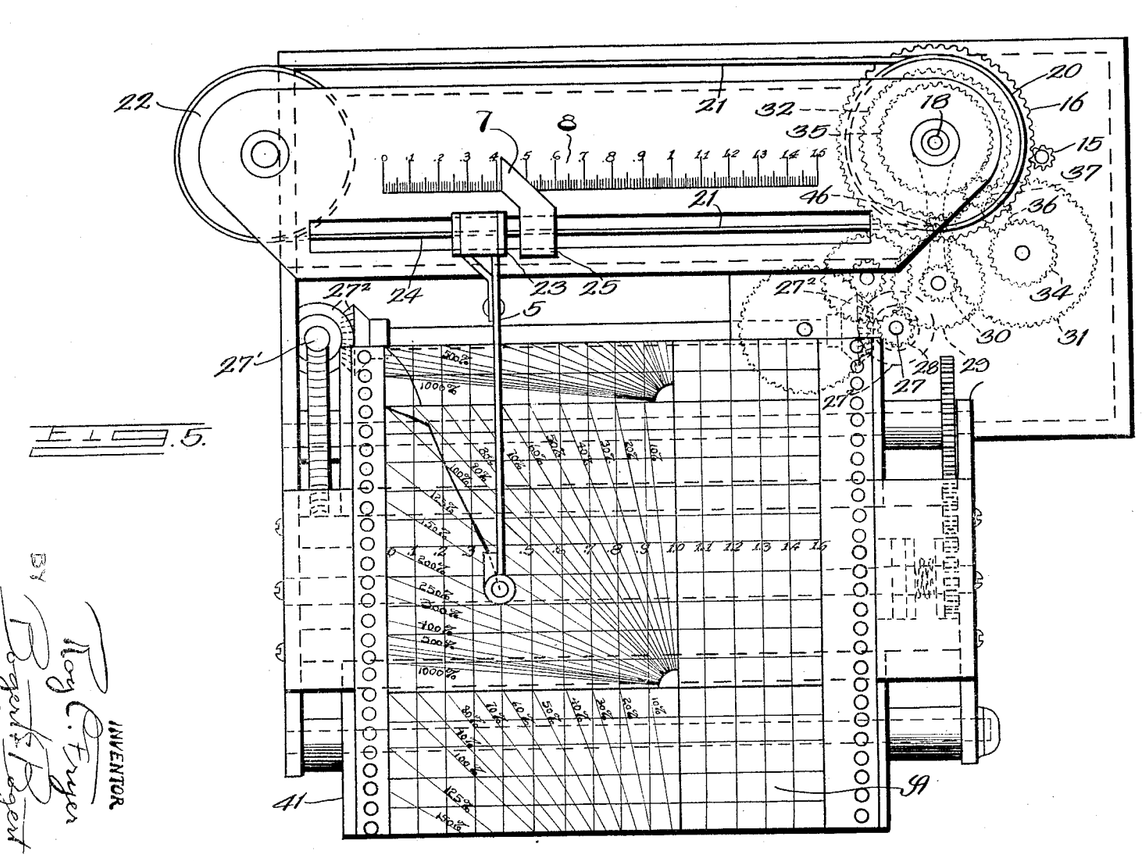
Fig. 5 is a front elevation of the meter mechanism.
Figure 6:
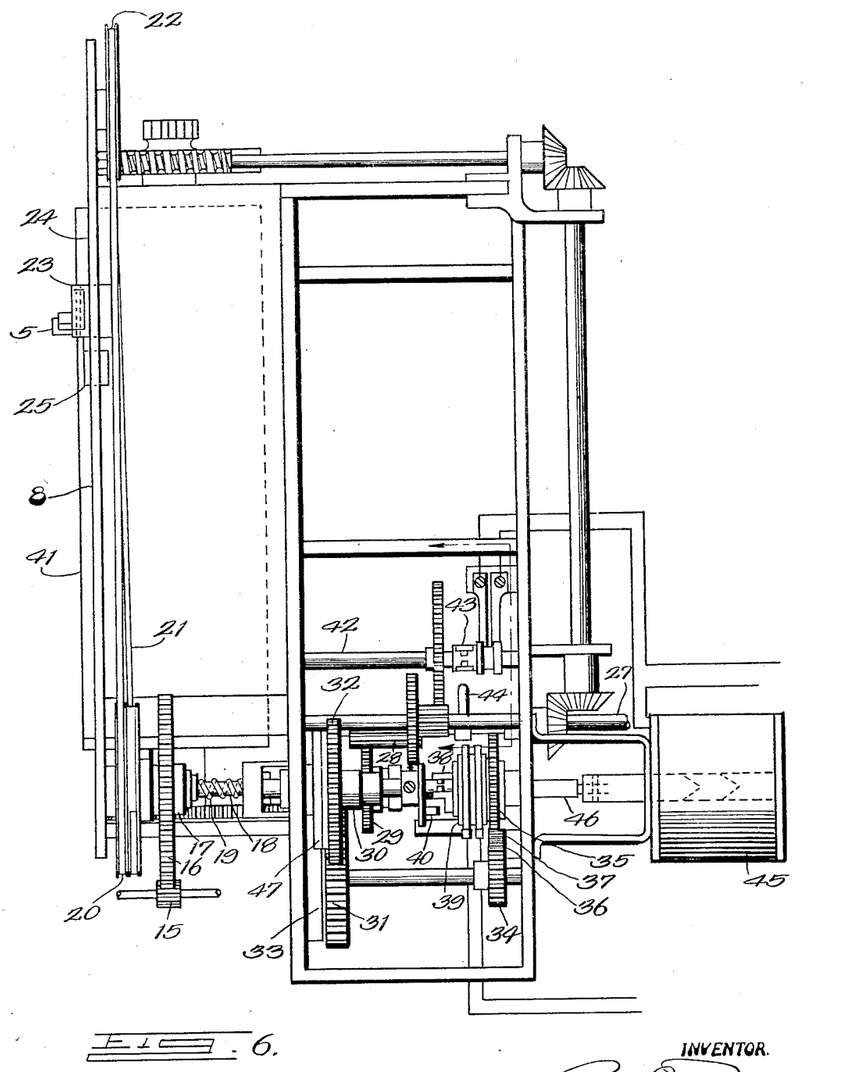
Fig. 6 is a plan view.
Figure 7:
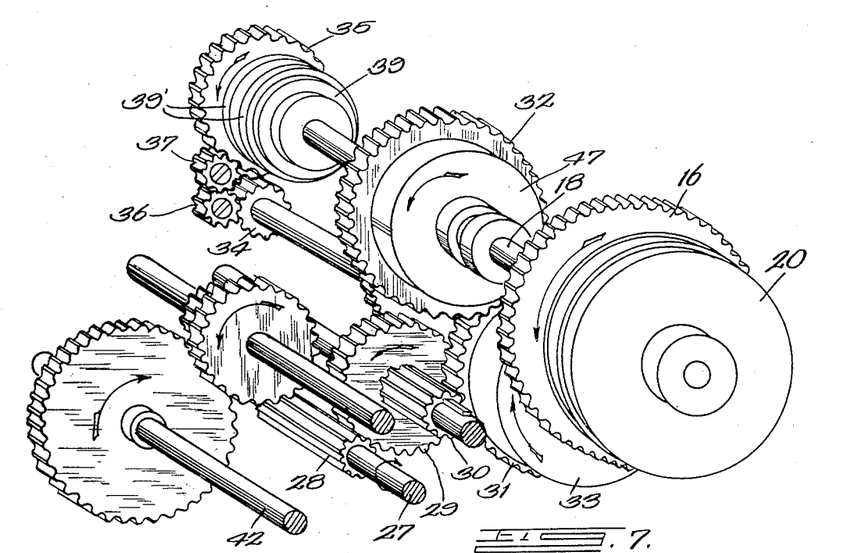
Fig. 7 is a perspective view of a gear train which enters into the construction.
Figures 8, 9:
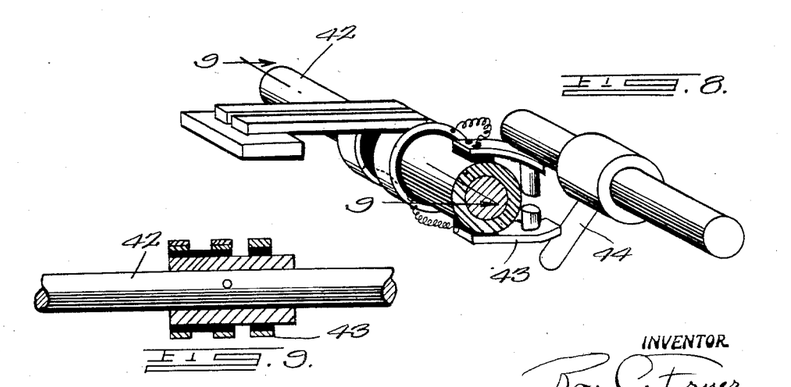
Fig. 8 is a perspective view of another switching mechanism that enters into the construction.
Fig. 9 is a sectional view on line 9—9 of Fig. 8.

The resetting operation may be accomplished automatically at the end of each demand interval, the control mechanism shown in Fig. 4 being preferred. The pinion 28 driven one revolution per minute by the clock, drives a shaft 42 one revolution each fifteen minute interval through the intermediation of the illustrated speed reducing gearing. The shaft 42 carries a contactor 43 which is closed once every fifteen minutes by a crank 44 carried on the shaft 27 along with the pinion 28. Thus the contactor can be closed for a second or so at the end of each time interval, so that the time lost in resetting is negligible as a source of error. The contactor 43 completes the circuit which energizes the reset solenoid 45. This energization causes the solenoid to pull upon the clutch shifting shaft 46, thus first engaging the friction clutch 47 and then disengaging pinion 30 from gear 31. The clutch 47 is splined to the shaft 18 so as to turn with and slide on it. When the clutch 47 is engaged, and the pinion 30 is disengaged, the reset spring 33 drives the gears 31 and 32 and the contactor gear 35 back to zero position. The clutch 47 engages firmly enough so that the gear 32 turns the shaft 18, slipping the watt hour meter clutch 17 until the demand pen returns to zero. Clutch 47 then slips until gears 31, 32 and 35 return to their zero positions. Contactor 43 then opens again and pinion 30 again engages gear 31 and clutch 47 is again disengaged, a new demand interval being thereupon initiated.

It should be observed that the timing contactor mechanism is not disengaged from the clock when the meter resets. Thus there is no cause for error or variation in the time intervals due to engaging and disengaging gears or clutches. The demand pen being reset positively to the zero line by a sliding friction clutch, no error is created by displacing the pen slightly off the zero line in the remeshing of gears.

The instrument may control the load so that the desired maximum demand may be uniformly maintained, but never exceeded, or so that a rate of consumption greater than that designated as the desired maximum demand may be used for a part of the demand interval, and a lesser rate for the rest of the demand interval, whereby the average rate for the interval, will be the desired rate and will not exceed the desired maximum demand. Let it be assumed, for example, that it is possible to reduce the load at will to 50% of that designated as the maximum demand, and that overloads are therefore permissible during part of the interval, provided that the load is reduced to 50% in time to avoid exceeding the desired demand registration. For this kind of operation, it is desired that the demand limitor contactor of the meter be arranged so that it shall not close until the meter pen reaches the sloping line marked 50% on the chart, and that if the pen does reach this 50% line the load will be reduced to 50% of normal full load value for the rest of the interval. Such performance of the demand limitor contactor is obtained as follows:

The changeable gears 36 and 37 are in such ratio that the contactor gear 35 will make one third of a revolution in fifteen minutes, instead of two thirds of a revolution as previously explained, and the stop is set so that the contactor resets to a position corresponding to the .5 line on the chart instead of to the zero line, referring to the KW demand scale. Thus the contactor will be closed if the demand pen reaches the sloping 50% line on the chart, and will signify that the load must be reduced immediately to 50% of the desired maximum demand value in order to avoid running up the demand reading above the desired point. Or, of course, the contactor can be made automatically to cut off the part of the load which can be shut down on such occasions.

The meter could be similarly modified for any similar form of load manipulation. The amount of load which must be continuous and can not be shut down will determine the "percent load" line which the demand limitor contactor may feasibly be made to follow. For most applications, where only a small portion of the load can be shut down at will, it is desirable to have the contactor follow the 100% load line, as described in the first explanation.

Having thus described my invention what I claim is:

1. The combination with a source of electric current and a load circuit supplied therefrom; of a motor having current and pressure winding respectively subject to the current and pressure of said circuit; a constant speed motor operating independently of the first mentioned motor; a responsive device; a controller for said responsive device inclusive of two cooperating members, each motor having one of said members individual thereto and operable thereby, said members being relatively disposed to be brought into and out of cooperating relation according to the relative speeds of said motors, the controller member operable by the first motor having flexible connection therewith permitting its movement out of proportion to the movement of this motor; and the controller member operable by the second motor but to move in proportion to the second motor movement upon sufficient reduction in speed of the first motor and this member.

2. The combination with a source of electric current and a load circuit supplied therefrom; of a motor having current and pressure windings respectively subject to the current and pressure of said circuit and operating proportionately to the wattage of the load; a second motor operating independently of such wattage; a signal device; a controller for said signal device inclusive of two cooperating members, each motor having one of said members individual thereto and operable thereby, said members being relatively disposed, to be brought into and out of cooperating relation according to the relative speeds of said meters, the controller member operable by the first motor having flexible connection therewith permitting its movement out of proportion to the movement of this motor; and a pick up device operable by the second motor and operable upon the latter member to move therewith upon sufficient reduction in speed of the first motor and this member.

4. The combination with a source of electric current and a load circuit supplied therefrom; of a meter having current and pressure windings respectively subject to the current and pressure of said circuit and operating proportionately to the wattage of the load; a second motor operating independently of such wattage; means for removing a portion of the load; a controller for said load portion removing means inclusive of two cooperating members, each motor having one of said members individual thereto and operable thereby, said members being relatively disposed to be brought into and out of cooperating relation according to the relative speeds of said motors, the controller member operable by the first motor having flexible connection therewith permitting its movement out of proportion to the movement of this motor; and a pick up device operable by the second motor and operable upon the latter member to move therewith upon sufficient reduction in speed of the first motor and this member.

5. The combination with a source of electric current and a load circuit supplied therefrom; of a motor having current and pressure windings respectively subject to the current and pressure of said circuit and operating proportionately to the wattage of the load; a second motor operating independently of such wattage; a switch in circuit with a portion of the load and operable to remove said load portion from circuit; a controller for said switch inclusive of two cooperating members, each motor having one of said members individual thereto and operable thereby, said members being relatively disposed to be brought into and out of cooperating relation according to the relative speeds of said motors, the controller member operable by the first motor having flexible connection therewith permitting its movement out of proportion to the movement of this motor; and a pick up device operable by the second motor and operable upon the latter member to move therewith upon sufficient reduction in speed of the first motor and this member.

6. The combination with a source of electric current and a load circuit supplied therefrom; of a motor having current and pressure windings respectively subject to the current and pressure of said circuit and operating proportionately to the wattage of the load; a second motor operating independently of such wattage; a responsive device; a controller for said responsive device inclusive of two cooperating members, each motor having one of said members individual thereto and operable thereby, said members being relatively disposed to be brought into and out of cooperating relation according to the relative speeds of said motors, the controller member operable by the first motor having flexible connection therewith permitting its movement out of proportion to the movement of this motor; a pick up device operable by the second motor and operable upon the latter member to move therewith upon sufficient reduction in speed of the first motor and this member; and an indicating scale moving with the controller member that is driven by the second motor, there being an index moving with the other controller member and cooperating with said scale.

6. The combination with a source of electric current and a load circuit supplied therefrom; of a motor having current and pressure windings respectively subject to the current and pressure of said circuit and operating proportionately to the wattage of the load; a second motor operating independently of such wattage; a signal device; a controller for said signal device inclusive of two cooperating members, each motor having one of said members individual thereto and operable thereby, said members being relatively disposed to be brought into and out of cooperating relation according to the relative speeds of said motors, the controller member operable by the first motor having flexible connection therewith permitting its movement out of proportion to the movement of this motor; a pick up device operable by the second motor and operable upon the latter member to move therewith upon sufficient reduction in speed of the first motor and this member; and an indicating scale moving with the controller member that is driven by the second motor, there being an index moving with the other controller member and cooperating with said scale.

7. The combination with a source of electric current and a load circuit supplied therefrom; of a motor having current and pressure windings respectively subject to the current and pressure of said circuit and operating proportionately to the wattage of the load; and a second motor operating independently of such wattage; means for removing a portion of the load; a controller for said load portion removing means inclusive of two cooperating members, each motor having one of said members individual thereto and operable thereby, said members being relatively disposed to be brought into and out of cooperating relation according to the relative speeds of said motors, the controller member operable by the first motor having flexible connection therewith permitting its movement out of proportion to the movement of this motor; a pick up device operable by the second motor and operable upon the latter member to move therewith upon sufficient reduction in speed of the first motor and this member; and an indicating scale moving with the controller member that is driven by the second motor, there being an index moving with the other controller member and cooperating with said scale.

8. The combination with a source of electric current and a load circuit supplied therefrom; of a motor having current and pressure windings respectively subject to the current and pressure of said circuit and operating proportionately to the wattage of the load; a second motor operating independently of such wattage; a switch in circuit with a portion of the load and operable to remove this load portion from circuit; a controller for said switch inclusive of two cooperating members, each motor having one of said members individual thereto and operable thereby, said members being relatively disposed to be brought into and out of cooperating relation according to the relative speeds of said motors, the controller member operable by the first motor having flexible connection therewith permitting its movement out of proportion to the movement of this motor; a pick up device operable by the second motor and operable upon the latter member to move therewith upon sufficient reduction in speed of the first motor and this member; and an indicating scale moving with the controller member that is driven by the second motor, there being an index moving with the other controller member and cooperating with said scale.

9. The combination with a source of electric current and a load circuit supplied therefrom; of a motor having current and pressure windings respectively subject to the current and pressure of said circuit and operating proportionately to the wattage of the load; a second motor operating independently of such wattage; an indicator inclusive of two cooperating members, each motor having one of said members individual thereto and operable thereby, one of said members including a scale and the other including an index movable over the scale, one of said members constituting a controller member operable by the first motor and having flexible connection therewith permitting its movement out of proportion to the movement of this motor; and a pick up device operable by the second motor and operable upon the other of said members to move therewith upon sufficient reduction in speed of the first motor and this member.

In testimony whereof I have hereunto affixed my signature.

ROY C. FRYER.